United States Patent
Wu

(10) Patent No.: US 8,036,179 B2
(45) Date of Patent: Oct. 11, 2011

(54) METHOD FOR TRANSMITTING MULTICAST DATA IN WIMAX/WIBRO RELAY SYSTEM

(75) Inventor: Qi Wu, Beijing (CN)

(73) Assignees: Samsung Electronics Co., Ltd (KR); Beijing Samsung Telecom R&D Center, Beijing (CN)

( * ) Notice: Subject to any disclaimer, the term of this patent is extended or adjusted under 35 U.S.C. 154(b) by 794 days.

(21) Appl. No.: 12/110,836

(22) Filed: Apr. 28, 2008

(65) Prior Publication Data

US 2008/0298296 A1    Dec. 4, 2008

(30) Foreign Application Priority Data

Apr. 27, 2007    (CN) .......................... 2007 1 0097590

(51) Int. Cl.
*H04W 4/00* (2009.01)

(52) U.S. Cl. ..... 370/332; 370/317; 370/329; 370/395.6; 370/437; 455/7; 455/11.1; 455/63.1; 455/114.2; 455/135; 455/296; 455/501; 375/254; 375/278; 375/284; 375/285; 375/296; 375/346

(58) Field of Classification Search ................ 370/310.2, 370/317, 328–339, 349, 395.6, 437; 455/7, 455/11.1, 422.1, 501, 63.1, 63.2, 114.2, 135, 455/296, 313, 334; 375/254, 278, 284, 285, 375/296, 346

See application file for complete search history.

(56) References Cited

U.S. PATENT DOCUMENTS

| | | | |
|---|---|---|---|
| 6,907,093 B2 | 6/2005 | Blount et al. | |
| 6,972,661 B2 | 12/2005 | Wang | |
| 2007/0087772 A1* | 4/2007 | Yi et al. ........................ | 455/522 |
| 2007/0142058 A1* | 6/2007 | Matsumura et al. ....... | 455/452.2 |
| 2007/0160014 A1* | 7/2007 | Larsson ........................ | 370/338 |
| 2008/0031197 A1* | 2/2008 | Wang et al. .................. | 370/331 |
| 2008/0170541 A1* | 7/2008 | Vartiainen et al. ............ | 370/328 |
| 2008/0171553 A1* | 7/2008 | Ren et al. ..................... | 455/450 |
| 2008/0214182 A1* | 9/2008 | Wang et al. .................. | 455/423 |
| 2010/0098030 A1* | 4/2010 | Wang et al. .................. | 370/335 |

* cited by examiner

*Primary Examiner* — Aung S Moe
*Assistant Examiner* — Hoon J Chung
(74) *Attorney, Agent, or Firm* — The Farrell Law Firm, P.C.

(57) ABSTRACT

A method for transmitting multicast data in a WiMax/WiBro relay system, including transmitting carrier-interference-noise ratios from UEs to corresponding Relays; selecting the minimum value among the carrier-interference-noise ratios; determining the modulation and coding mode according to the selected minimum value; transmitting the modulation and coding mode to BS; selecting a modulation and coding mode with a highest rate for multicast data on an access link; transmitting the final modulation and coding mode to the Relays; and transmitting data via the access link with the modulation and coding mode determined by the BS.

7 Claims, 2 Drawing Sheets

METHOD FOR TRANSMITTING MULTICAST DATA IN WIMAX/WIBRO RELAY SYSTEM

PRIORITY

This application claims priority under 35 U.S.C. §119(a) to a Chinese Patent Application filed in the State Intellectual Property Office of China on Apr. 27, 2007 and assigned Serial No. 200710097590.4, the contents of which are herein incorporated by reference.

BACKGROUND OF THE INVENTION

1. Field of the Invention

The present invention relates generally to a cellular system including a relay, and in particular, to an effective method for transmitting multicast data in a Worldwide Interoperability for Microwave Access/Wireless Broadband (WiMax/WiBro) relay system.

2. Description of the Related Art

In order to enhance signal power and suppress interference when transmitting multicast data in a WiMax/WiBro relay system, it is often necessary for both a Base Station (BS) and several Relay Stations (RSs) participating in the multicast service to simultaneously transmit data with the same coding/modulation. In such transmission schemes, the interference from adjacent RSs or BSs usually becomes useful signals. For a User Equipment (UE), signals from different transmitters can be regarded as multi-path signals. As long as the difference between the signals is within the guard interval of an Orthogonal Frequency Division Multiplexing (OFDM) symbol, they can be correctly received as useful signals.

When multicast data is transmitted in a conventional WiMax/WiBro relay system, extreme differences exist between channels because the distances between the receivers and the RSs or the BSs are different. In order to guarantee that the receiver on a channel having poor quality can correctly decode data with some acceptable probability, a lower-order modulation scheme and more powerful coding are usually applied to multicast data. However, this is a severe waste of resources for UEs having good channel conditions.

In a Terrestrial Digital Video Broadcast (DVB-T) scheme, a method called hierarchical modulation is proposed, in which low-order modulation is embedded in high-order modulation for transmission. For instance, QPSK is embedded in 64 QAM or 16 QAM. The hierarchical modulation method bears close relation to the video transmission in DVB-T. A piece of high-definition video can be usually divided into a basic layer and multiple enhancement layers. The basic layer can offer video with standard definition. The video cannot be decoded with only the enhancement layer, and video streams of higher definition can be provided only when the basic layer is used together. Therefore, the basic layer is the stream with high priority and usually adopts lower-order modulation plus strong coding scheme to guarantee that it can be correctly received by UEs; the enhancement layers are the streams with low priority and adopt high-order modulation and weak coding scheme for transmission. With the hierarchical modulation method, the basic layer with high priority is embedded in the enhancement layers levels with low priority for the purpose of transmission. UEs having good channel conditions can decode both the basic layer and the enhancement layers simultaneously in order to obtain high-definition video, and UEs having poor channel conditions can decode the basic layer to obtain video with basic definition.

In the hierarchical modulation method, enhancement layer signals with high-order modulation interfere with basic layer signals with low-order modulation in the constellation. Consequently, an adjustable separation factor $\alpha$ is proposed in DVB-T, which means that, in the constellation, at least the distance of a least constellation points should exist between every two of constellation points of low-order modulation. Therefore, increasing $\alpha$ can reduce the interference caused by high-order modulated signals to low-order modulated signals. However, increasing $\alpha$ also reduces the least constellation point distance. Consequently, higher SINR is required to distinguish two different constellation points of high-order modulation. Actually, the separation factor $\alpha$ can regulate the interference between high-order modulated signals and low-order modulated signals. The greater $\alpha$ is, the more interference low-order modulated signals inflict on high-order modulated signals; the smaller $\alpha$ is, the more interference high-order modulated signals cause to low-order modulated signals.

The hierarchical modulation solution is suitable for video data transmission in broadcast services, but it is not suitable for application in either WiMax or WiBro system for a number of reasons.

First, for the hierarchical modulation solution, it is necessary to modify the receiver greatly, especially when the constellation needs to be adjusted according to the separation factor $\alpha$. All the current amended versions of WiMax and WiBro system emphasize that the receiver needs to be backward compatible.

Second, the high-order modulation part in the hierarchical modulation solution can only be used by UEs in good channel conditions in signal receiving. In non-video services, if UEs in good channel conditions has no data to receive, resource of such part is still wasted.

Third, with the hierarchical modulation solution, although interference between high-order modulated signals and low-order modulated signals can be regulated by using the separation factor to adjust the constellation, because the two types of signals are transmitted via the same constellation, there is no way to regulate transmitting power for different signals, which leads to the loss of power control, an effective approach for interference suppression.

SUMMARY OF THE INVENTION

Accordingly, the present invention has been designed to address at least the problems and/or disadvantages described herein and to provide at least the advantages described below. Accordingly, an aspect of the present invention is to provide an efficient method for transmitting multicast data in a WiMax/WiBro relay system.

In accordance with an aspect of the present invention, there is provided a method for transmitting multicast data in a WiMax/WiBro relay system. The method includes: transmitting, by UEs, carrier-interference-noise ratios (CINRs) to their corresponding RSs, respectively; selecting, by a multicast modulation and coding mode decision module of each relay, the minimum value among the carrier-interference-noise ratios and determining the modulation and coding mode according to the selected minimum value; transmitting, by the multicast modulation and coding mode report module of each relay, the modulation and coding mode to BS; selecting, by the multicast modulation and coding mode selection module of the BS, according to the multicast modulation and coding modes from different relays, one with highest rate as the modulation and coding mode for multicast data on an access link and transmitting the final modulation and coding mode to the relays; and transmitting data, by the access link multicast data transmitting module of the BS and the access link multicast data transmitting modules of the relays, via the access link with the modulation and coding mode determined by the BS.

In the present invention, the method of high-order modulation plus repetition is applied to multicast data transmission, i.e., more repetitions for UEs in poor channel conditions and less repetitions or no repetition for UEs in good channel conditions. The saved sub-channels can be used to transmit other data so that radio resources can be utilized flexibly and efficiently.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF PREFERRED EMBODIMENTS

Preferred embodiments of the present invention will be provided herein below with reference to the accompanying drawings. In the following description, well-known functions or constructions are not described in detail since they would obscure the invention in unnecessary detail.

Figure 1:
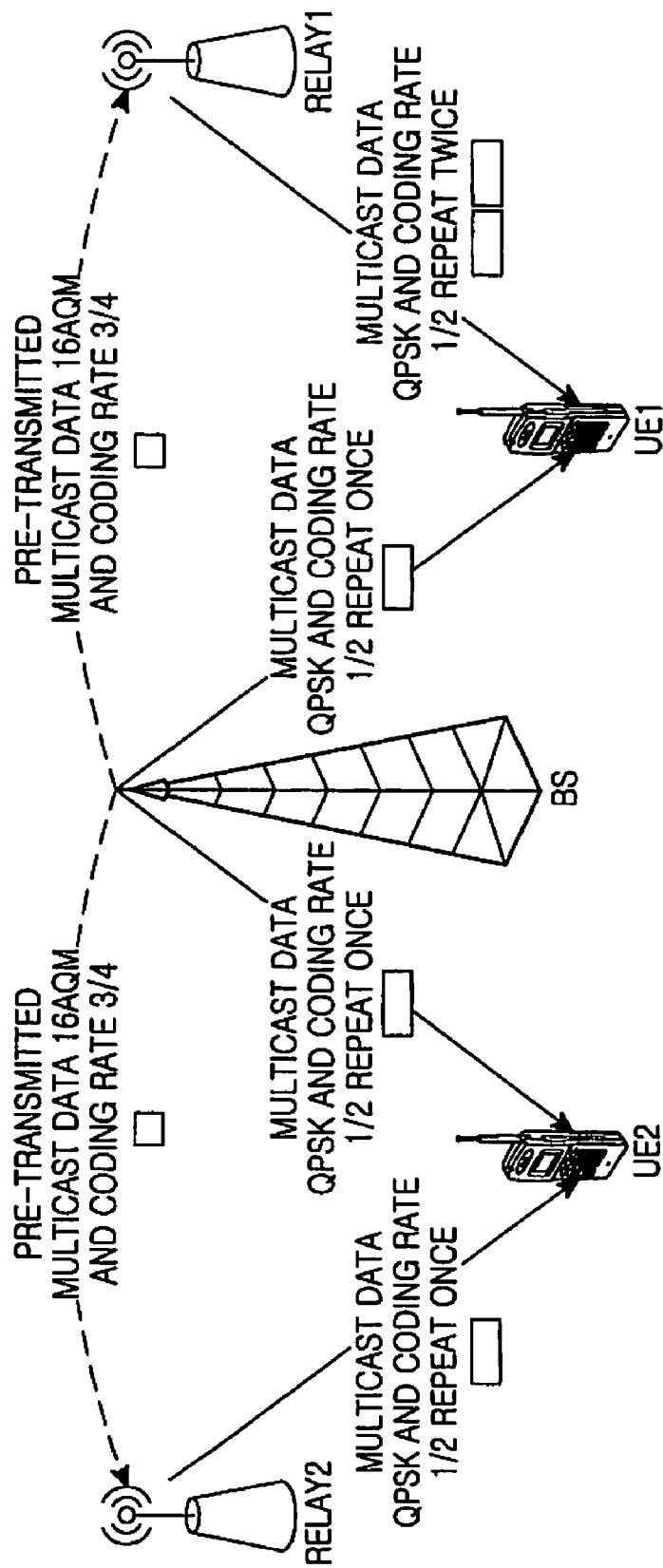
FIG. 1 is a schematic diagram of efficient multicast data transmission jointly completed by a BS and relays.
Figure 2:
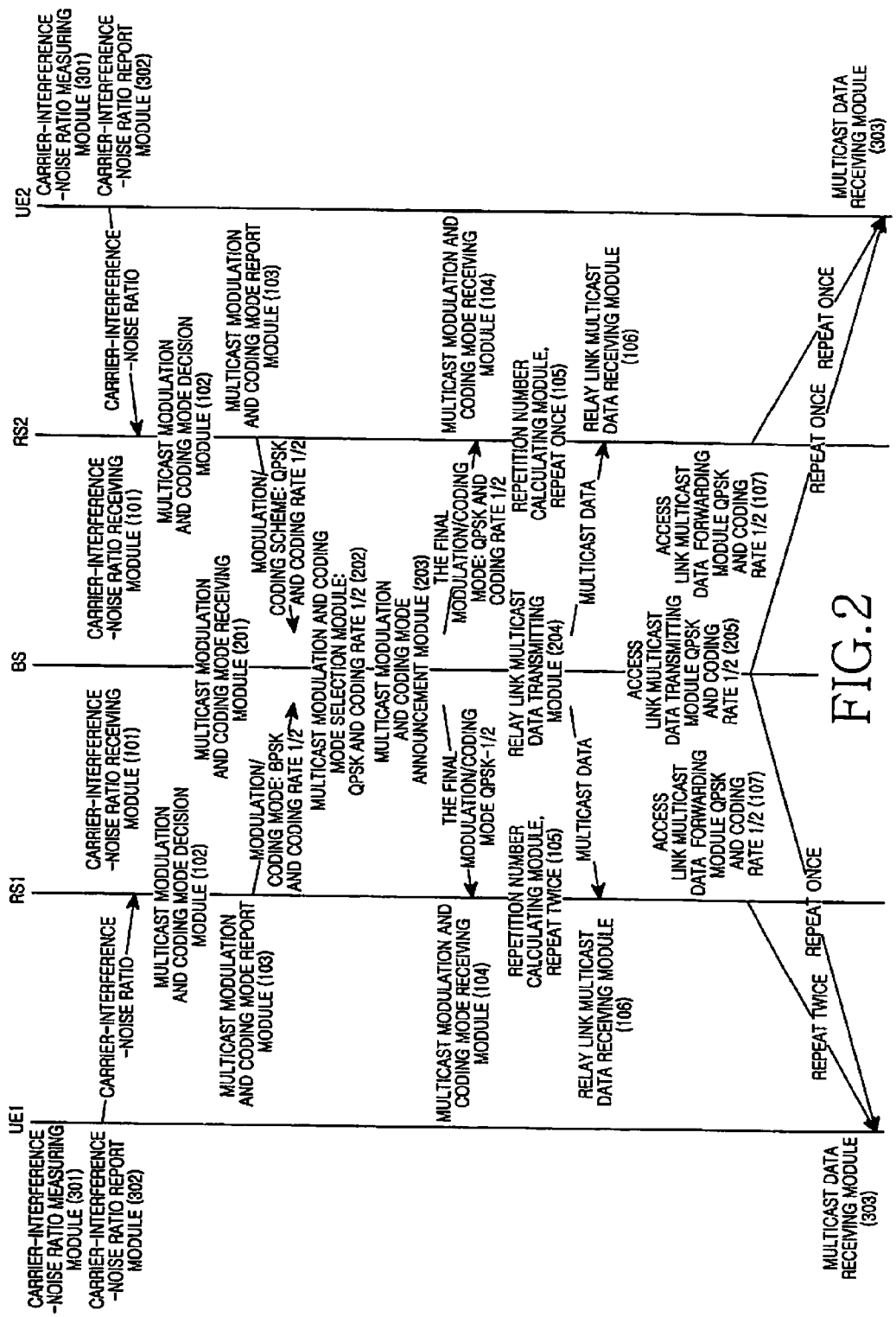
FIG. 2 is a message flowchart for efficient multicast data transmission jointly completed by a BS and relays.

FIG. 1 is a schematic diagram of efficient multicast data transmission jointly completed by a BS and relays. Referring to FIGS. 1 and 2, the diagram of the efficient multicast data transmission is completed by a BS and relays (Relay1 and relay2). Each relay includes a carrier-interference-noise ratio (CINR) receiving module 101, which receives carrier-interference-noise ratios sent from the carrier-interference-noise ratio report modules 302 of UEs; a multicast modulation and coding mode decision module 102, which selects the minimum value among the carrier-interference-noise ratios received by the carrier-interference-noise ratio receiving module 101 and then decides the modulation and coding mode based on the minimum value; a multicast modulation and coding mode report module 103, which transmits the modulation and coding mode decided by the multicast modulation and coding mode decision module 102 to the multicast modulation and coding mode receiving module 201 of a BS; a multicast modulation and coding mode receiving module 104, which receives the modulation and coding mode, called the final modulation and coding mode, sent from the multicast modulation and coding mode report module 203 of the BS; a repetition number calculating module 105, which calculates the required number of repetitions according to the final modulation and coding mode received by the multicast modulation and coding mode receiving module 104 and the modulation and coding mode decided by the multicast modulation and coding mode decision module 102.

The details of the above calculation will be described herein below.

Assuming that the spectrum efficiency corresponding to the modulation and coding mode decided by the multicast modulation and coding mode decision module 102 is x bit per second per hertz, the spectrum efficiency corresponding to the final modulation and coding mode received by the multicast modulation and coding mode receiving module 104 is y bits per second per hertz, and the number of repetitions selectable by the system can be r1, r2, ..., rm with r1<r2<...<rm, (e.g., 802.16e system supports 1 repetition, 2, 4 and 6 repetitions). The calculated number of repetitions is the least among those greater than y/x in the set {r1, r2, ..., rm}.

The relay link multicast data receiving module 106 receives the multicast data from the relay link multicast data transmitting module 204 of the BS. The access link multicast data forwarding module 107 transmits the data received by the multicast data receiving module 106 over the access link, with the final modulation and coding mode received by the multicast modulation and coding mode receiving module 104 and the number of repetitions calculated by the repetition number calculating module 105.

The BS includes a multicast modulation and coding mode receiving module 201, which receives the multicast modulation and coding modes from the relays; a multicast modulation and coding mode selection module 202, which selects the one with highest rate among the multicast modulation and coding modes from different relays and received by the multicast modulation and coding mode receiving module 201, as the modulation and coding mode for multicast data on an access link. The access link is defined as a link of whom one of the transmitting end or the receiving end is a UE, and the relay link is defined as a link of whose neither the transmitting end nor the receiving end is a UE.

A multicast modulation and coding mode announcement module 203 transmits the modulation and coding mode on the access link and selected by the multicast modulation and coding mode selection module 202 to the relays. The relay link multicast data transmitting module 204 transmits the multicast data to the relays and an access link multicast data transmitting module 205 transmits data over the access link with the modulation and coding mode announced by the multicast modulation and coding mode report module 203.

Each of the UEs includes a carrier-interference-noise ratio measuring module 301 that measures the carrier-interference-noise ratio according to received signals, a carrier-interference-noise ratio report module 302 that reports the carrier-interference-noise ratio measured by the carrier-interference-noise ratio measuring module 301 to a relay or a BS, and a multicast data receiving module 303, which receives multicast data from the BS or the relay, or multicast data sent by the BS and the relay simultaneously.

Based on the structure described above, the process of efficient transmission of multicast data implemented cooperatively by the BS and the relays is illustrated in FIG. 1. Further, the message delivery process is illustrated in more detail in FIG. 2.

Referring to FIGS. 1 and 2, there is one BS, two relays (Relay1 (RS1) and Relay2 (RS2)) and two UEs (UE1 and UE2) in a certain cell. Detailed steps for efficient transmission of multicast data implemented cooperatively by the BS and relays will be described below with reference to FIG. 2.

First, the carrier-interference-noise ratio measuring module 301 in UE1 measures the carrier-interference-noise ratio according to received signals. Here this value is set as CINR1. Thereafter, the carrier-interference-noise ratio measuring module 301 in UE2 measures the carrier-interference-noise ratio according to received signals. Here this value is set as CINR2.

The carrier-interference-noise ratio report module 302 in UE1 reports the carrier-interference-noise ratio CINR1 measured by the carrier-interference-noise ratio measuring module 301 to the carrier-interference-noise ratio receiving module 101 in Relay1 and reports the carrier-interference-noise ratio CINR2 measured by the carrier-interference-noise ratio measuring module 301 to the carrier-interference-noise ratio receiving module 101 in Relay2.

The carrier-interference-noise ratio receiving module 101 in Relay1 receives the carrier-interference-noise ratio CINR1 sent from the carrier-interference-noise ratio report module 302 in UE1, and the carrier-interference-noise ratio receiving module 101 in Relay2 receives the carrier-interference-noise ratio CINR2 sent from the carrier-interference-noise ratio report module 302 in UE2.

The multicast modulation and coding mode decision module 102 in Relay 1 decides the multicast modulation and coding mode (modulation is BPSK and to coding rate is ½) to be adopted according to the carrier-interference-noise ratio CINR1 received by the carrier-interference-noise ratio receiving module 101. Further, the multicast modulation and coding mode decision module 102 in Relay2 decides the multicast modulation and coding mode (modulation is QPSK and coding rate is ½) to be adopted according to the carrier-interference-noise ratio CINR2 received by the carrier-interference-noise ratio receiving module 101.

Thereafter, the multicast modulation and coding mode report module 103 in Relay1 transmits the modulation and coding mode of BPSK and coding rate ½ decided by the multicast modulation and coding mode decision module 102 to the multicast modulation and coding mode receiving module 201 in the BS.

The multicast modulation and coding mode receiving module 201 in the BS receives the modulation and coding mode (BPSK and coding rate ½) reported by the multicast modulation and coding mode report module 103 in Relay1, and the multicast modulation and coding mode report module 103 in Relay2 transmits the modulation and coding mode (QPSK and coding rate ½) decided by the multicast modulation and coding mode decision module 102 to the multicast modulation and coding mode receiving module 201 in the BS. The multicast modulation and coding mode receiving module 201 in the BS receives the modulation and coding mode (QPSK and coding rate ½) reported by the multicast modulation and coding mode report module 103 in Relay2.

Thereafter, the multicast modulation and coding mode selection module 202 selects the modulation and coding mode with highest rate (QPSK and coding rate ½) based on the multicast modulation and coding modes, BPSK and coding rate ½ as well as QPSK and coding rate ½, received by the multicast modulation and coding mode receiving module 201, respectively from Relay1 and Relay2, as the modulation and coding mode for multicast data on the access link.

The multicast modulation and coding mode announcement module in the BS transmits the multicast modulation and coding mode, QPSK and coding rate ½, selected by the multicast modulation and coding mode selection module 202 to Relay and Relay 2, respectively. Both of the multicast modulation and coding mode receiving modules 104 in Relay 1 and Relay 2 receive the final modulation and coding mode, QPSK and coding rate ½, from the multicast modulation and coding mode announcement module 203.

The repetition number calculating module in Relay1 calculates the required number of repetitions according to the final modulation and coding mode, QPSK and coding rate ½ received by the multicast modulation and coding mode module 104 as well as the modulation and coding mode BPSK and coding rate ½ decided by the multicast modulation and coding mode decision module 102. More specifically, the spectrum efficiency corresponding to the modulation and coding mode decided by the multicast modulation and coding mode decision module 102 is ½ bit per second per hertz. The spectrum efficiency corresponding to the final modulation and coding mode received by the multicast modulation and coding mode receiving module 104 is 1 bit per second per hertz, and the numbers of repetitions selectable by the system are 1, 2, 4, and 6, respectively. Because the value which is the least among those greater than 1/(½) is 2, the calculation result for the number of repetitions is 2.

The repetition number calculating module in Relay1 calculates the required number of repetitions according to the final modulation and coding mode, QPSK and coding rate ½, received by the multicast modulation and coding mode module 104 as well as the modulation and coding mode, QPSK and coding rate ½, decided by the multicast modulation and coding mode decision module 102. More specifically, the spectrum efficiency corresponding to the modulation and coding mode decided by the multicast modulation and coding mode decision module 102 is 1 bit per second per hertz. The spectrum efficiency corresponding to the final modulation and coding mode received by the multicast modulation and coding mode receiving module 104 is 1 bit per second per hertz, and the numbers of repetitions selectable by the system are 1, 2, 4, and 6, respectively. Because the value that is the least among those greater than 1/1 is 1, the calculation result for the number of repetitions is 1.

The relay link multicast data transmitting module 204 in the BS transmits the multicast data to Relay 1 and Relay 2, respectively. Both of the relay link multicast data receiving modules 106 in Relay 1 and Relay 2 receive the multicast data sent from the relay link multicast data transmitting module 204 in the BS.

The access link multicast data transmitting module 205 in the BS, the access link multicast data forwarding module 107 in Relay1, and the access link multicast data forwarding module 107 in Relay2 simultaneously adopt the mode of QPSK and coding rate ½ to transmit the multicast data over the access link to UE1 and UE2, with one repetition performed in the BS and Relay2, and two repetition performed in Relay1. Thereafter, both UE1 and UE2 receive the multicast data respectively from the BS, Relay1, and Relay2.

Assuming there is one BS, six relays (Relay1, Relay2, Relay3, Relay4, Relay5, and Relay6), and six UEs (UE1, UE2, UE3, UE4, UE5, and UE6) in a certain cell. The modulation and coding modes for Relay1→UE1 (i.e., the transmission from Relay1 to UE1), Relay2→UE2, Relay3→UE3, Relay4→UE4, Relay5→UE5 and Relay6→UE6 are QPSK-1/2, BPSK-1/2, QPSK-1/2, QPSK-3/4, 16QAM-1/2, and 16QAM-3/4, respectively. The number of repetitions the system can support are 1, 2, 4, and 6. The rate of multicast message is 153.6 Kb/s, the frame length of OFDMA is 5 ms, and there are 32 sub-channels. When the spectrum utilization is 1, each OFDM symbol can transfer 768 bits information. According to the above assumption, it can be calculated that each OFDMA time-frequency unit can transfer 768/32=24 bits information when the spectrum utilization is 1.

In the conventional multicast system, it is necessary to adopt the above modulation and coding mode with the lowest rate, i.e., BPSK-1/2, for multicast data for the UE in the poorest channel conditions, i.e., UE2. In the case of such modulation and coding mode, resource to be consumed, i.e., the number x of OFDMA time-frequency units occupied by each Relay, can be calculated as follows:

the amount of multicast data to be transferred for each frame is $153.6*10^3*5*10^{-3}=768$ bits;

spectrum efficiency corresponding to BPSK-1/2 is $1*\frac{1}{2}=0.5$ b/s/Hz; and the number of OFDMA time-frequency units is x=768/(24*0.5)=64.

With the method for efficient transmission of multicast data in the present invention, the adopted modulation and coding mode can be the highest one, 16QAM-3/4. The number of repetitions required for the transmission Relay1→UE1 can be calculated according to the method proposed in the present invention. More specifically, the spectrum efficiency corresponding to 16QAM-3/4 is 4*¾=3 bits per second per hertz, the spectrum efficiency corresponding to QPSK-1/2 is 2*½=1 bit per second per hertz, and in the set {1, 2, 4, 6}, the least among those greater than 3/1=3 is 4, so the transmission Relay1→UE should be repeated 4 times.

Similarly, the repetition numbers required for the transmissions Relay2→UE2, Relay3→UE3, Relay4→UE4, Relay5→UE5, and Relay6→UE6 can be calculated as 6, 4, 2, 2, and 1, respectively.

Similarly, the number of OFDMA time-frequency units occupied by Relay6 for transmitting multicast data can be calculated as:

the amount of multicast data to be transferred for each frame is 153.6*10^3*5*10^-3=768 bits;

the spectrum efficiency corresponding to 16QAM-3/4 is 4*¾=3 bits per second per hertz; and the number of OFDMA time-frequency units x=768/(24*3)=10.7=11.

The OFDMA time-frequency units occupied by Relay1~Relay5 for transmitting multicast data are the above numbers multiplied by corresponding numbers of repetitions, i.e., 44, 66, 44, 22, and 22, respectively. The average number is (44+66+44+22+22+11)/6=34.83.

This comparison shows that (64-34.83)/64=45.57% of the overall resource can be saved with the method of the present invention.

While the present invention has been shown and described with reference to certain preferred embodiments thereof, it will be understood by those skilled in the art that various changes in form and details may be made therein without departing from the spirit and scope of the present invention as defined by the claims.

What is claimed is:

1. A method for transmitting multicast data in a WiMax/WiBro relay system, comprising:

transmitting, by User Equipments (UEs), carrier-interference-noise ratios to their corresponding Relays;

selecting, by a Multicast modulation and coding mode decision module of each Relay, a minimum value among the carrier-interference-noise ratios received from the corresponding UEs;

determining a modulation and coding mode according to the selected minimum value;

transmitting, by a multicast modulation and coding mode report module of each Relay, the modulation and coding mode to a Base Station (BS);

selecting, by a multicast modulation and coding mode selection module of the BS, according to the multicast modulation and coding modes from different Relays, a multicast modulation and coding mode with a highest rate as a final modulation and coding mode for multicast data on an access link;

transmitting the final modulation and coding mode to the Relays; and transmitting, by an access link multicast data transmitting module of the BS and access link multicast data transmitting modules of the Relays, data via the access link with the final modulation and coding mode determined by the BS.

2. The method of claim 1, further comprising:

calculating, by each of the Relays, a repetition number for the multicast data transmission to the corresponding UEs, after receiving the final modulation and coding mode sent from the BS.

3. The method according to claim 2, wherein each of the Relays transmits the multicast data to the corresponding UEs according to the calculated repetition number.

4. The method according to claim 1, wherein when the BS and the Relays transmit the multicast data to the corresponding UEs, a modulation and coding mode with a higher rate is utilized, instead of a modulation and coding mode acceptable to a poorest channel.

5. The method according to claim 1, wherein the Relays and the BS participating in multicast service transmit multicast data to the UEs simultaneously.

6. The method according to claim 1, wherein each of the Relays selects a modulation and coding mode with a lowest rate within its coverage.

7. The method according to claim 1, wherein the transmission of multicast data from the BS to the UEs is repeated only once.

* * * * *